United States Patent [19]
Horstmeier et al.

[11] 3,761,648
[45] Sept. 25, 1973

[54] SINGLE ARM CURRENT COLLECTOR DEVICE FOR ELECTRICALLY DRIVEN VEHICLES

[75] Inventors: Gerhard Horstmeier; Gerhard Moehring, both of Schuettorf, Germany

[73] Assignee: Firma August Stemmann OHG, Schuettorf i.H., Germany

[22] Filed: Nov. 1, 1971

[21] Appl. No.: 194,666

[30] Foreign Application Priority Data
Nov. 21, 1970 Germany............... P 20 57 325.5

[52] U.S. Cl. ............................................. 191/70
[51] Int. Cl............................................. B60l 5/24
[58] Field of Search...................... 191/45, 50, 60.3, 191/64, 65, 66, 68, 70

[56] References Cited
UNITED STATES PATENTS
2,935,576  5/1960  Faiveley................. 191/68

FOREIGN PATENTS OR APPLICATIONS
225,231  4/1961  Austria................... 191/66

Primary Examiner—Gerald M. Forlenza
Assistant Examiner—D. W. Keen
Attorney—Arthur O. Klein

[57] ABSTRACT

An extensible single arm current collector device for electrically driven vehicles, said collector means having pivotally connected scissor arms which are spring biased toward their extended upper or outer position. The device includes means whereby the mechanical advantage between the spring and the scissor arms is progressively changed as the device is collapsed from its upper, extended operative position to its lowermost, retracted but operative position, whereby the contact pressure between the collector device and a trolley wire remains at least generally constant over the range of operative height adjustment of the collector device.

7 Claims, 5 Drawing Figures

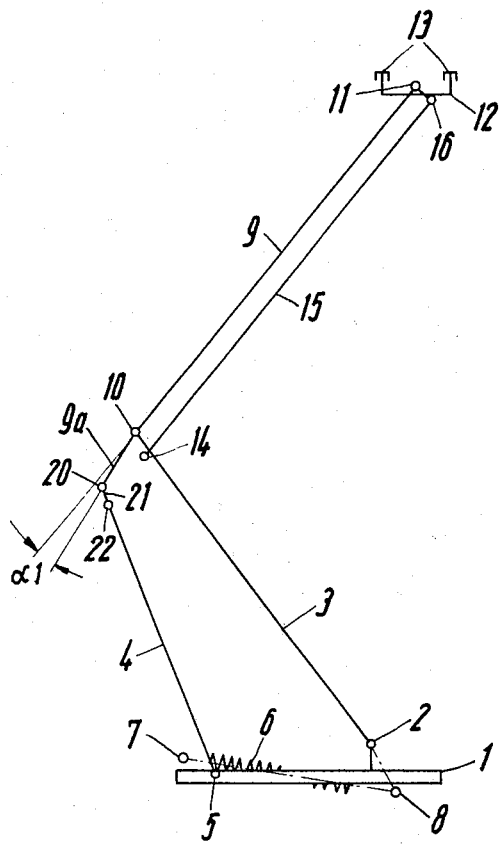
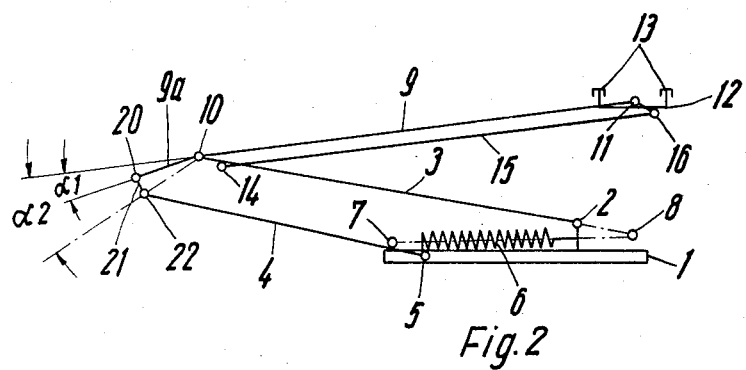

SINGLE ARM CURRENT COLLECTOR DEVICE FOR ELECTRICALLY DRIVEN VEHICLES

The invention relates to a single arm trolley or current collector means for electrically driven vehicles.

In its illustrative embodiment, such device substantially consists of a lower scissor arm and a lower guide pole, both of which are mounted on a base frame, two trapeze forming upper scissor arms, and an upper guide pole which is pivotably connected to the lower scissor arm and the lower guide pole, and which carries the current collector head at its upper end. The aforedescribed single arm current collector means are also sometimes referred to as half scissor-pickup or collector means.

In the previously known single arm pickup means the working space and the dimensions of construction have a definite relationship which is that in its uppermost working position the angle between the lower and upper scissor arms of the current collector means amounts to approximately 90°. This means that for enlarging the working region upwardly the lower scissor arm and/or the upper scissor arm must be correspondingly enlarged. Since the space available for the construction of the current collector means on the roof of the electrically driven vehicle is often very limited, a current collector means occupying a large space can often not be accommodated, or can be accommodated only under difficult circumstances.

It is an object of this invention to enlarge the working space of the single arm collector means when predetermined constructional measurements are given; conversely, a larger working space of the current collector means is permitted, the constructional measurements of the device can be increased.

For this purpose the invention provides that the upper scissor arms are extended via their pivot point at the lower scissor arm, and are bent at a certain angle alpha downwardly, and that an intermediate member is provided which, when the current collector means are lowered from the upper working region into a lower working region, displaces the point of attachment of the lower guide pole by the upper scissor arms and thereby enlarges the effective angle between the longitudinal axis of the upper scissor arms and line between the pivot point of the upper scissor arms and the point of attachment of the lower guide pole.

In accordance with the invention the angle between the longitudinal axis of the upper scissor arms and the connecting line between the pivot point of the upper scissor arms and the point of attachment of the lower guide pole at the downwardly angled upper scissor arms is changed in such a way that it is smaller in the upper working region than in the lower working region. Due to the small angle alpha in the upper working region, there is obtained a high contact pressure. This, however, would produce in the lower working region too high a contact pressure if this angle were not enlarged by means of an intermediate member past a predetermined working height. The present invention makes possible the attainment of substantially uniform pressure of contact between the current collector shoes and a trolley wire over the entire range of vertical adjustment of the collector device. With such substantially uniform contact pressure over the entire working region it is possible to construct the current collector means with smaller dimensions with a given working volume, and to obtain a larger working volume with given dimensions. By enlarging the angle alpha from smaller value in the upper working region to a larger value in the lower working region there is simultaneously attained the results that the lowest point of the working region can be situated so deeply that the lower scissor arm can be lowered to the horizontal. A further advantage of the current collector means in accordance with the invention results finally in that the smaller angle alpha in the upper working region is instrumental in obtaining higher effective spring tension which permits an enlargement of the opening angle between the lower and upper scissor arms and thereby brings about a larger working space.

A further characteristic of the invention resides in the fact that the intermediate member, which has two pivot points wherein there are stop members which coact with corresponding opposite surfaces in the transfer from the upper to the lower working space of the current collector means, forms a rigid connection between the turning point of the upper scissor arms and the lower scissor arm and the lower pivot point of the intermediate member, that is, the point of attachment of the lower guide pole to the intermediate member.

It is furthermore advantageous that at the intermediate member limit stops are provided which when coacting with opposite surfaces form a means for limiting the height of the current collector means. By means of this, the current collector means cannot rise above their upper working space when there is no cable along which the collector means travels present within the working space, for example, during mounting of the current collector means onto a vehicle.

One embodiment of the subject matter of the invention is described hereinbelow in connection with the drawings. In the drawings:

FIG. 1 is a schematic side view of a one-arm pickup means in accordance with the invention in the upper portion of its working space or region;

FIG. 2 is a schematic side view of the one-arm pickup means of FIG. 1 in the lower portion of its working region;

Figure 5:
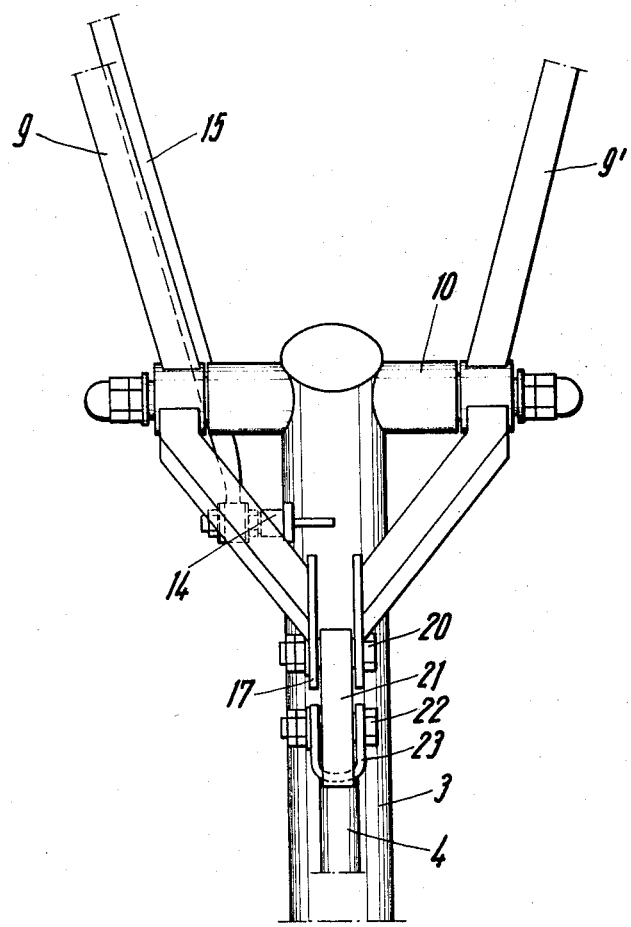
FIG. 5 is a view in end elevation of the intermediate member with the fragmentarily shown principal parts of the current collector means of the invention.

Turning now to the drawings, the reference number 1 designates a base frame which is mounted on the roof of an electrically power driven vehicle (not shown) by means of insulating members. On a horizontal axle or pivot 2 on the base frame 1 there is mounted a lower scissor arm 3. A lower guide pole 4 is pivotally mounted on an axle at point 5 on the base frame 1. Coil tension springs 6 engage the base frame 1 at a pivot point 7 and at the lower end of scissor arm 3 at a pivot point 8. There are connected to the lower scissor arm 3 two V- or trapeze-shaped upper scissor arms 9, 9' (FIG. 5) connected to each other by means of a member 10 shown in detail in FIG. 5; the upper scissor arms 9, 9' carry via a member 11 a current collector head which is embodied at its upper end with a wiper 12 having frictional sliding members 13 which engage a power wire or trolley line (not shown). At the lower scissor arm 3 there is mounted a pivot 14 on which there is mounted an upper guide pole 15; pole 15 is connected to the upper scissor arms 9, 9' at the pivot point 16. The upper scissor arms 9, 9' thus form with the upper guide pole 15 a jointed quadrilateral 10-11-16-14.

Figure 3:
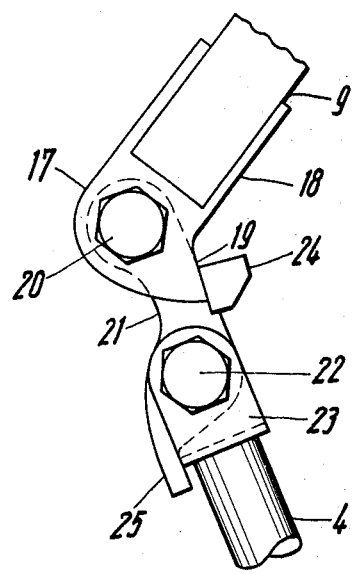
FIG. 3 is a view in side elevation of an intermediate member in accordance with the invention in the position which it assumes in the uppermost position of the one-arm pickup means.
Figure 4:
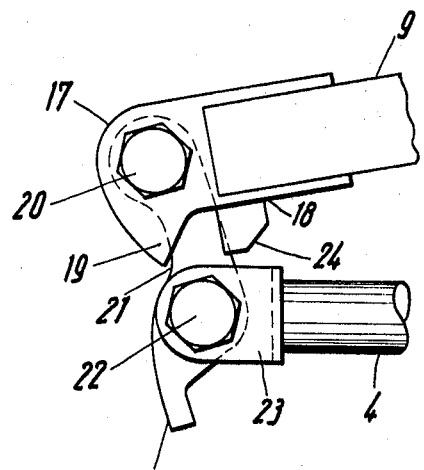
FIG. 4 is a view in side elevation of the intermediate member in the position it assumes in a lower position of the one-arm pickup means.

In FIG. 1 the upper scissor arms 9, 9' are extended via the pivot point 10 and are angled dowwardly at an angle alpha$_1$ ($\alpha_1$). As can be particularly seen in FIGS. 3–5, there is mounted at the extended and bent portions 9$a$ of the upper scissor arms 9,9' a fork-like support member 17 which has limit surfaces 18 and 19. The support member 17, at its pivot point 20, and thereby at the extended bent ends 9$a$ of the upper scissor arms 9, 9' has mounted thereon an intermediate member 21 that is mounted with the lower pivot point 22 in a fork-like support member 23 on the lower guide pole 4. The intermediate member 21 has two stop members 24 and 25.

As can be seen in FIG. 1 in the upper working position of the current collector means the lower guide pole 4 engages the arms 9, 9' via the intermediate member 21. Portions 9$a$ of arms 9, 9' form an angle alpha$_1$ ($\alpha_1$) with the respective arms 9, 9'. This angle alpha$_1$ can be very small, whereby thre relatively small tensional force of the drive spring 6 can be very well utilized in the upper working position of the collector device spring 6 being almost released up to its pretension, so that in this upper working region, even at its upper end, which lies immediately underneath the uppermost position of the current collector means (see FIG. 3), the desired contact pressure can be attained.

When one lowers the current collector means from its upper working position, this contact pressure would increase and become too large if the effective angle between the longitudinal axis of the upper scissor 9, 9' and the connecting line between the joint 10 of the upper scissor arms 9, 9' to the lower scissor arm 3 and the point of attachment of the lower guide pole 4 where enlarged. This results by reason of the fact that with the lowering of the stop member 24 (FIG. 4) the intermediate member 21 positions itself against the stop surface 18 of the fork-like support member 17 of the upper scissor arms 9, 9', whereby the straight connecting line up to this point of the working region is bent between the lower pivot point 5 and the upper pivot point 20 of the lower guide pole 4 at the pivot point 22 (see FIG. 2). As a result, the effective angle between the longitudinal axis of the upper scissor arms 9, 9' and the connecting line between the joint of turning point 10 of the upper scissor arms 9, 9' and the lower scissor arm 3 and the attaching point 22 of the lower guide pole 4 is enlarged to the value alpha$_2$ (see FIG. 2).

Due to the intermediate guide member 21 in accordance with the invention, there is also obtained the advantage that the lowermost region of the current collector means can be positioned so deeply that the upper scissor arm 9, 9' and the lower guide pole 4 can be brought into a horizontal position.

In order to prevent the current collector means from rising above their upper working region, if that is possible when no trolley cable is present within the working region, for example when mounting the current pickup means on a vehicle, the current collector means is provided with a collector means height limiting arrangement. This height limiting arrangement is, in accordance with the preferred form of the intermediate linkage of the invention, obtained by providing stop means which engage each other at the desired uppermost position of the current collector means. Such stop means takes the form of the aforementioned stop surface 19 on member 18 and the member 24 on the intermediate member 21. Surface 19 engages member 24 when the collector means is extended to its full height, thereby avoiding a further rise of the current collector means (see FIG. 3).

The invention is obviously not limited to the aforedescribed and illustrated arrangement; constructional variations are intended to be included in the scope of the annexed claims.

Accordingly, although the invention is illustrated and described with reference to one preferred embodiment, it is to be expressly understood that it is in no way limited to the disclosure of such a preferred embodiment, but is capable of numerous modifications within the scope of the appended claims.

What is claimed is:

1. An extensible single arm current collector device for electrically driven vehicles consisting essentially of a lower scissor arm and a lower guide pole, both of which are pivotally mounted on a base frame, two trapeze-shaped upper scissor arms and an upper guide pole which are pivotally connected with the lower scissor arm and the lower guide pole, a current collector body at the upper ends of the upper scissor arm and the upper guide pole for engagement with a trolley wire, a spring which constantly urges the collector device toward its extended position, and means for progressively changing the mechanical advantage between the spring and the scissor arms as the device is collapsed from its extended position, whereby contact pressure between the contact body and a trolley wire remains generally constant over the operative range of extension of the collector device, the means for progressively changing the mechanical advantage between the spring and the scissor arms as the device is collapsed comprising extensions on the upper scissor arms which extend to a joint at the lower scissor arm and are angled downwardly at a first angle, an intermediate member between the lower guide pole and the extended and downwardly bent portions of the upper scissor arms, the intermediate member at the lowering of the current collector means from an upper working position into a lower working position shifting the point of attachment of the lower guide pole to the upper scissor arms and thereby increasing the effective angle between the longitudinal axis of the upper scissor arms and the line between the joint between the upper scissor arms and the point of attachment of the lower guide poles.

2. A current collector device according to claim 1, wherein the intermediate member has sets of stop surfaces which coact with opposite surfaces on the lower guide pole and the angularly bent extensions on the upper scissor arms, thereby forming a height limiting arrangment for the current collector device.

3. An extensible single arm current collector device for electrically driven vehicles consisting essentially of a lower scissor amr and a lower guide pole, both of which are pivotally mounted on a base frame, two trapeze-shaped upper scissor arms and an upper guide pole which are pivotally connected with the lower scissor arm and the lower guide pole, a current collector body at the upper ends of the upper scissor arm and the upper guide pole for engagement with a trolley wire, a spring which constantly urges the collector device toward its extended position, and means for progressively changing the mechanical advantage between the spring and the scissor arms as the device is collapsed from its extended position, whereby contact pressure between the contact body and a trolley wire remains generally constant over the operative range of extension of the collector device, the intermediate member being pivotally connected to the upper end of the guide pole and the extended and downwardly bent portions of the upper scissor arms.

4. A current collector device according to claim 3, wherein the intermediate member has stop surfaces which coact with corresponding opposite surfaces at a transition from the upper to the lower working positions of the current collector device thereby forming a rigid connection between the joint of the upper scissor arms at the lower scissor arm and the pivot point of attachment of the intermediate member to the lower guide pole at the intermediate member.

5. A single arm current collector device for electrically driven vehicles, comprising a base frame, a lower scissor arm and a lower guide pole which are both pivotally connected to the base frame, two trapeze-shaped upper scissor arms which are pivoted to the lower scissor arm and are extended above their turning point on the lower scissor arm to the lower guide pole and are bent downwardly at a first, constant angle, an upper guide pole which is pivotally connected to the lower scissor arm and the lower guide pole, and a current collector means mounted on the upper end of the upper guide pole, an intermediate member arranged between the lower guide pole and the extended and bent downwardly part of the upper scissor arms, the parts being so constructed and arranged that the intermediate member, while lowering the current collector from the upper working region to the lower working region, shifts the point of application of the lower guide pole to the upper scissor arms and thereby creates a second, much larger effective angle between the longitudinal axis of the upper scissor arms and the line between the pivotal joint of the upper scissor arms and the point of application of the lower guide pole.

6. A single arm current collector according to claim 5, comprising step members interacting with the intermediate guide member and its two pivot points, the stop members, when working together with the corresponding stop surfaces during the transition from the upper to the lower working region of the current collector creating a rigid connection between the joint of the lower scissor arms to the lower scissor arm and the lower pivot point of the intermediate guide member.

7. A single arm current collector in accordance with claim 5, wherein the stop members are arranged on the intermediate guide member, the stop members in cooperation with the stop surfaces limiting the height of erection of the current collector.

* * * * *